United States Patent
Engesser et al.

(10) Patent No.: US 7,602,582 B2
(45) Date of Patent: Oct. 13, 2009

(54) FLUID DYNAMIC BEARING SYSTEM

(75) Inventors: Martin Engesser, Donaueschingen (DE); Stefan Schwamberger, Hermsdorf (DE)

(73) Assignee: Minebea Co., Ltd., Nagano-ken (JP)

( * ) Notice: Subject to any disclaimer, the term of this patent is extended or adjusted under 35 U.S.C. 154(b) by 418 days.

(21) Appl. No.: 11/493,325

(22) Filed: Jul. 26, 2006

(65) Prior Publication Data
US 2007/0030591 A1   Feb. 8, 2007

(30) Foreign Application Priority Data
Aug. 2, 2005   (DE) .................... 10 2005 036 214

(51) Int. Cl.
   *G11B 17/02*   (2006.01)
   *F16C 32/06*   (2006.01)
   *H02K 5/16*    (2006.01)
(52) U.S. Cl. ................... 360/99.08; 384/107; 310/90
(58) Field of Classification Search .............. 360/99.08, 360/99.04, 98.07; 384/100, 107; 310/322, 310/90, 90.5, 67 R
   See application file for complete search history.

(56) References Cited

U.S. PATENT DOCUMENTS

| | | | |
|---|---|---|---|
| 2005/0006969 A1* | 1/2005 | Kull | 310/90 |
| 2005/0084189 A1* | 4/2005 | Oelsch | 384/107 |
| 2005/0094906 A1* | 5/2005 | Satoh | 384/107 |
| 2005/0111766 A1* | 5/2005 | Gotoh et al. | 384/100 |
| 2005/0140227 A1* | 6/2005 | Kuwert | 310/90 |
| 2005/0213857 A1* | 9/2005 | Beckers | 384/107 |
| 2005/0238267 A1* | 10/2005 | Nakamura et al. | 384/107 |
| 2008/0030103 A1* | 2/2008 | Neumann | 310/322 |

* cited by examiner

*Primary Examiner*—Brian E Miller
(74) *Attorney, Agent, or Firm*—Cooper & Dunham LLP

(57) ABSTRACT

The bearing system according to the invention comprises a sleeve-shaped first bearing disk having a bore concentric to a rotational axis, a cylindrical shaft disposed in the bore and connected to the first bearing disk, the shaft having a second bearing disk disposed at one end that is arranged at a spacing to the first bearing disk such that an annular disk-shaped space is formed between the first and the second bearing disk. A third annular bearing disk is provided that is disposed in the annular disk-shaped space and is rotatable about the rotational axis, the opposing surfaces of the first, the second and the third bearing disk as well as the shaft being separated from one another by a bearing gap filled with bearing fluid. A radial bearing is provided between the outside circumference of the shaft and the inside circumference of the third bearing disk and marked by the hydrodynamic bearing patterns associated with the circumferential surfaces. A first axial bearing is provided that is formed by the opposing end faces of the first and the third bearing disk and the hydrodynamic bearing patterns associated with these end faces, and a second axial bearing formed by the opposing end faces of the second and the third bearing disk and the hydrodynamic bearing patterns associated with these end faces.

15 Claims, 3 Drawing Sheets

FLUID DYNAMIC BEARING SYSTEM

BACKGROUND OF THE INVENTION

The invention relates to a fluid dynamic bearing system used particularly to rotatably support a small-scale spindle motor, as preferably employed for driving hard disk drives.

PRIOR ART

The ongoing miniaturization of hard disk drives is giving rise to new problems in their design and construction, particularly with regard to the design and construction of small drive motors and suitable bearing systems. Fluid dynamic bearing systems are being increasingly employed as bearing systems due to their small-scale construction and greater precision.

Due to the ongoing miniaturization of spindle motors and consequently the bearing systems employed in them, conventional design solutions are either impossible to apply or can only be applied with difficulty in the design and construction of miniature spindle motors. The smaller the bearing systems become, the greater are the requirements placed on component tolerances and mounting precision.

The rotor of the spindle motor, for example, is generally fixedly connected to the shaft of the bearing system using an interference fit. To this effect, the rotor is provided with a bore concentric to its rotational axis, the bore having a specific diameter and a specific length into which one end of the shaft is pressfitted. The reduction in the overall size of the spindle motor and bearing system is achieved, among other factors, at the cost of the potential length of the joint between the rotor and shaft, with the result that it may not be possible to attain the necessary holding force for this connection. If the interference is increased as a compensatory measure, this could lead to damage to the components during the pressfitting process. What is more, due to component and assembly tolerances and an inadequate joint length, larger or smaller deviations between the actual and the theoretical time-invariant rotational axis could occur when the rotor is mounted onto the shaft. These deviations stem from the fact that the central axis of the rotor does not correspond exactly to the central axis of the shaft that carries the rotor. This results in an undesirable large runout of the rotor, both axial (lateral runout) as well as radial (radial runout), in the rotor tilting with respect to the rotational axis of the shaft and in reduced resistance to shock.

The resulting rotor imbalance or wobble results in a runout that can be measured as total indicated runout (TIR). If the spindle motor is used for driving a hard disk drive, for example, an excessive TIR could lead, under certain circumstances, to the magnetic storage disks being rendered unreadable. One solution to this problem is to construct the rotor and the shaft integrally as one piece. However, this solution is technically complex and thus relatively expensive.

SUMMARY OF THE INVENTION

It is thus the object of the invention to provide a compact bearing system used particularly to rotatably support a spindle motor in which the TIR is very slight even when the overall height of the bearing system is kept low.

This object has been achieved according to the invention by the characteristics outlined in patent claim 1.

Beneficial embodiments and further developments of the invention can be derived from the subordinate claims.

The bearing system according to the invention comprises a sleeve-shaped first bearing disk having a bore concentric to a rotational axis, a cylindrical shaft disposed in the bore and connected to the bearing disk, the shaft having a second bearing disk disposed at one end that is arranged at a spacing to the first bearing disk such that an annular disk-shaped space is formed between the first and the second bearing disk. A third annular bearing disk is provided which is disposed in the annular disk-shaped space and rotatable about the rotational axis, the opposing surfaces of the first, the second and the third bearing disk being separated from one another by a bearing gap filled with bearing fluid. At least one radial bearing is provided between the outside circumference of the shaft and the inside circumference of the third bearing disk and is marked by hydrodynamic bearing patterns associated with the circumferential surfaces. A first axial bearing is provided which is formed by the opposing end faces of the first and the third bearing disk and the hydrodynamic bearing patterns associated with these end faces, and a second axial bearing, formed by the opposing end faces of the second and the third bearing disk and the hydrodynamic bearing patterns associated with these end faces.

The described bearing system has a simple construction and is made up of only a few components. The "long" connection between the shaft and the first bearing disk and the "central" fixing of the hub to the third bearing disk makes the bearing system less susceptible to tilt.

The bearing patterns are preferably disposed on the surface of the third bearing disk as this means that only one component need be provided with bearing patterns. The bearing patterns can of course be alternatively or additionally disposed on the surfaces associated with the shaft and the first and second bearing disk.

The bearing system according to the invention is particularly meant as a part of a spindle motor as used, for example, for driving hard disk drives. In this event, the third bearing disk is connected at its outside circumference to the hub of such a spindle motor.

As an alternative, the hub and the third bearing disk could be integrally formed as one piece, the bearing patterns being applied to this component using, for example, the electrochemical machining (ECM) process.

According to a first embodiment, the hub is substantially designed as a hollow cylindrical body, the third bearing disk being fixed to the inside circumference of the hub. An open end of the hub is closed by a covering cap, the covering cap enclosing the second bearing disk to a very large extent and sealing it with respect to the environment. A gap remains between the outer surface of the second bearing disk and the inner surface of the covering cap, the gap being connected to the bearing gap and filled with bearing fluid.

According to another embodiment, the hub is substantially designed as a cup-shaped body, the third bearing disk being fixed to the inside circumference of the hub. The hub encloses the second bearing disk to a very large extent and seals it with respect to the environment. A gap is provided between the outer surface of the second bearing disk and the inner surface of the hub, the gap being connected to the bearing gap and filled with bearing fluid.

To improve the circulation of the bearing fluid in the bearing gap provision can be made for the opposing radial sections of the bearing gap to be connected to each other by at least one axial channel, the channel preferably running along the outer surface of the third bearing disk or the inner surface of the hub.

An annular space connected to the bearing gap and tapering in the direction of the bearing gap is preferably disposed at the open end of the bearing gap between a surface of the inside circumference of the hub and an opposing surface of the outside circumference of the first bearing, the space being at least partly filled with bearing fluid. This space delimits the bearing gap to the outside and forms a capillary seal for the purpose of sealing the bearing gap. At the same time, the space acts as a reservoir for the bearing fluid.

Moreover, additional fluid dynamic patterns adjoining the gap can be located on the surface of the topside of the shaft and/or the underside of the covering cap or the closed hub respectively, the patterns providing air turbulence or acting as an additional axial bearing.

By integrating the functions of the components, the bearing system according to the invention consists of only a few components which can be manufactured using conventional production methods. Since the required tilt resistance is not achieved through radial bearings having a large axial spacing, but rather primarily through the axial bearings, the required overall height can be kept low. This nevertheless provides high axial stiffness. The radial stiffness that is still required is provided by the radial bearing.

The invention is described in more detail below on the basis of an embodiment with reference to the drawings. Further characteristics, advantages and possible applications of the invention can be derived from the drawings and their description.

DESCRIPTION OF PREFERRED
EMBODIMENTS OF THE INVENTION

Figure 1:
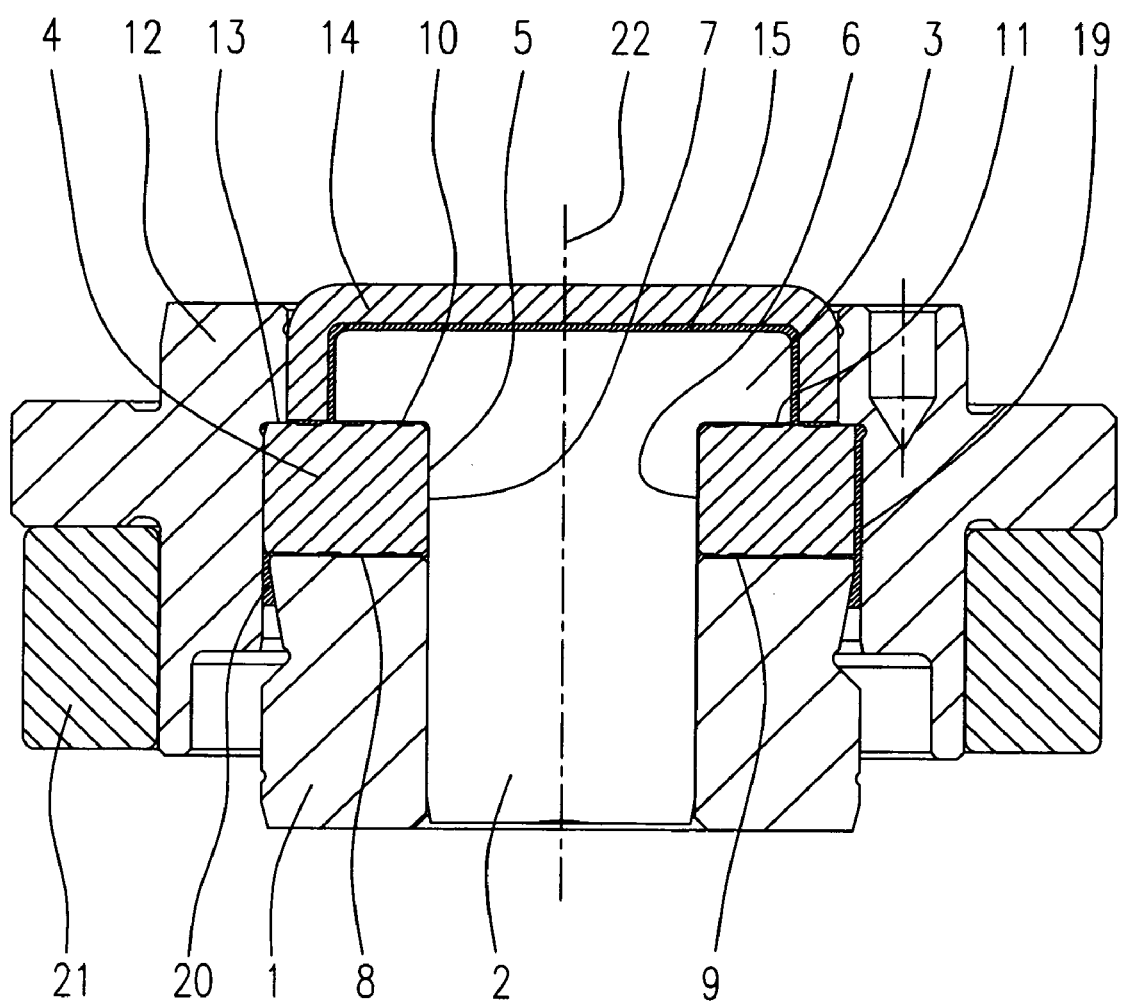
FIG. 1: a section through a first embodiment of the bearing system according to the invention.

FIG. 1 shows the basic construction of a first embodiment of the bearing system according to the invention. The bearing system is characterized by its simple design and construction and comprises a first sleeve-shaped bearing disk 1 having a bore concentric to the rotational axis 22, the bearing disk 1 forming a stationary part of the bearing system. A shaft 2 is accommodated in the bore of the bearing disk 1 and fixedly connected to the bearing disk. A second bearing disk 3 is provided at the free end of the shaft 2. This bearing disk 3 is preferably integrally formed with the shaft 2 as one piece. The bearing disk 3 is disposed at a spacing to the first bearing disk 1 such that an annular disk-shaped space is formed between the two bearing disks 1, 3. The rotating part of the bearing system is formed by a third annular bearing disk 4 that is accommodated in the annular disk-shaped space and is rotatable about the rotational axis 22. The opposing surfaces, i.e. the adjoining surfaces, of the first, the second and the third bearing disk 1, 3, 4 as well as the shaft 2 are separated from one another by a bearing gap 5 filled with bearing fluid.

The bearing system comprises a radial bearing 6 that is formed by the circumferential surface of the shaft 2 and the opposing inside circumferential surface of the third bearing disk 4 as well as bearing patterns 7 that are disposed on the surface of the shaft 2 and/or the surface of the third bearing disk 4. The surface patterns 7 are formed in such a way that, when the bearing disk 4 is set in rotation, they exert a pumping action on the bearing fluid directed to the center of the radial bearing. The bearing patterns 7, for example, are formed in a conventional way as parabola-shaped or herringbone patterns.

A first axial bearing 8 is formed by the opposing end faces of the first bearing disk 1 and the third bearing disk 4 as well as the hydrodynamic bearing patterns 9 associated with these end faces. The bearing patterns 9 are preferably disposed on the surface of the third bearing disk 4. However, they could also be disposed on the surface of the first bearing disk. A second axial bearing 10 is provided that is formed by the opposing end faces of the second bearing disk 3 and the third bearing disk 4 as well as the bearing patterns 11 associated with these end faces. The bearing patterns 9, 11 are preferably disposed on the end face of the third bearing disk 4 and given a spiral shape. These spiral-like patterns 9, 11 exert a pumping action on the bearing fluid that is primarily directed radially inwards in the direction of radial bearing 7 when the third bearing disk 4 rotates. Together with the radial bearing 7, the axial bearings 8, 10, relatively larger in diameter and acting towards the interior of the bearing, ensure high axial and radial stiffness of the bearing.

It is also possible to operate the bearing system with only one single axial bearing, axial bearing 10 for example. It is then necessary to ensure corresponding axial preloading of the third bearing disk 4 in the direction of the second bearing disk 3. Magnetic preloading can be used here in the conventional way. The other "axial bearing" 8 can then be used, as required, solely as an auxiliary bearing for turbulence or to pump the bearing fluid.

According to the invention, the illustrated bearing system forms part of a spindle motor, the rotating bearing component, i.e. the third bearing disk 4, being connected at its outside circumference to a hub 12 of the spindle motor. The connection between the hub 12 and the bearing disk 4 can, for example, take the form of an interference fit or a welded joint, particularly a laser welded joint, a shoulder 13 being provided on the hub for the exact positioning of the bearing disk 4 within the hub 12. The hub itself is substantially designed as a hollow cylindrical body, the upper opening in the hub 12 being covered by a covering cap 14 that encloses the second bearing disk to a very large extent and seals it with respect to the environment. At the same time, the bearing gap in this region is sealed towards the outside. The covering cap 14 is fixed to the hub 12 such that a gap 15 remains between the outer surface of the second bearing disk 3 and the inner surface of the covering cap 14, the gap being connected to the bearing gap 5 and filled with bearing fluid. The bearing fluid can flow freely between the adjoining regions of the bearing gap 5 via this gap 15.

A channel 19 is further provided to improve the circulation of the bearing fluid in the bearing gap 5, the channel connecting the two radial sections of the bearing gap 5 to each other. At least one such channel is provided, preferably several channels 19 distributed over the circumference of the bearing system. These channels 19 are preferably provided on the outer surface of the third bearing disk 4.

The hub 12 extends in an axial direction to a large extent over the first bearing disk 1, a larger or smaller gap remaining between the outside circumference of the first bearing disk 1 and the inside circumference of the hub 12. A space 20 between the inside circumference of the hub 12 and the outside circumference of the first bearing disk 1 forms part of this gap. This annular space 20 directly adjoins the bearing gap 5 and is connected to it. The space 20 is at least partly filled with bearing fluid and tapers in the direction of the bearing gap 5, delimits the bearing gap towards the outside and forms a capillary seal in a conventional way for the purpose of sealing the bearing gap. The space further forms a reservoir for the bearing fluid. The proposed bearing system thus has only one opening for the bearing gap 5 towards the environment. This opening is sealed by means of the capillary seal and leads into the "interior" of the bearing system, i.e. away from the surface of the hub 12. This is particularly important when the spindle motor containing the bearing system is used for driving a hard disk drive, in order to protect the sensitive storage disks fixed to the hub 12 against contamination through the bearing fluid.

The hub 12 of the spindle motor carries a magnetic arrangement 21 in the conventional way that forms part of an electromagnetic drive system of the spindle motor.

Figure 2:
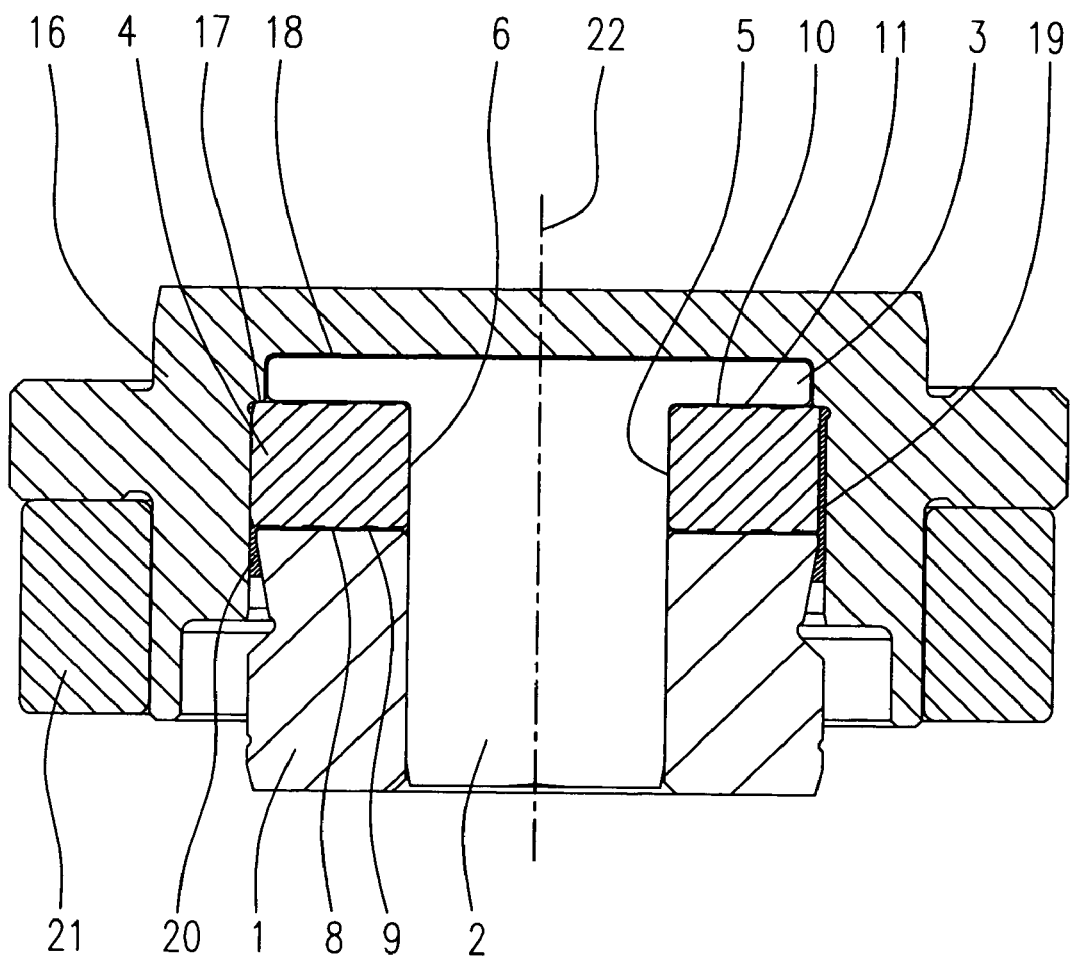
FIG. 2: a section through a second embodiment of the bearing system according to the invention.

FIG. 2 shows a second embodiment of the bearing system according to the invention where, with reference to FIG. 1 and the associated description, the same components found in FIG. 2 are given the same reference numbers.

In contrast to FIG. 1, the third bearing disk 4 is connected to a cup-shaped or bell-shaped hub 16 that is closed at one end. This hub 16 again has a rebate 17 to position the third bearing disk 4. The closed end of the hub 16 encloses the second bearing disk 3 almost completely, a gap 18 also being provided between the outer surface of the second bearing disk 3 and the inner surface of the hub 16, the gap 18 being connected to the gap 5 and filled with bearing fluid. The gap 18 acts as a distribution channel for the bearing fluid between the adjoining sections of the bearing gap 5.

Figure 3:
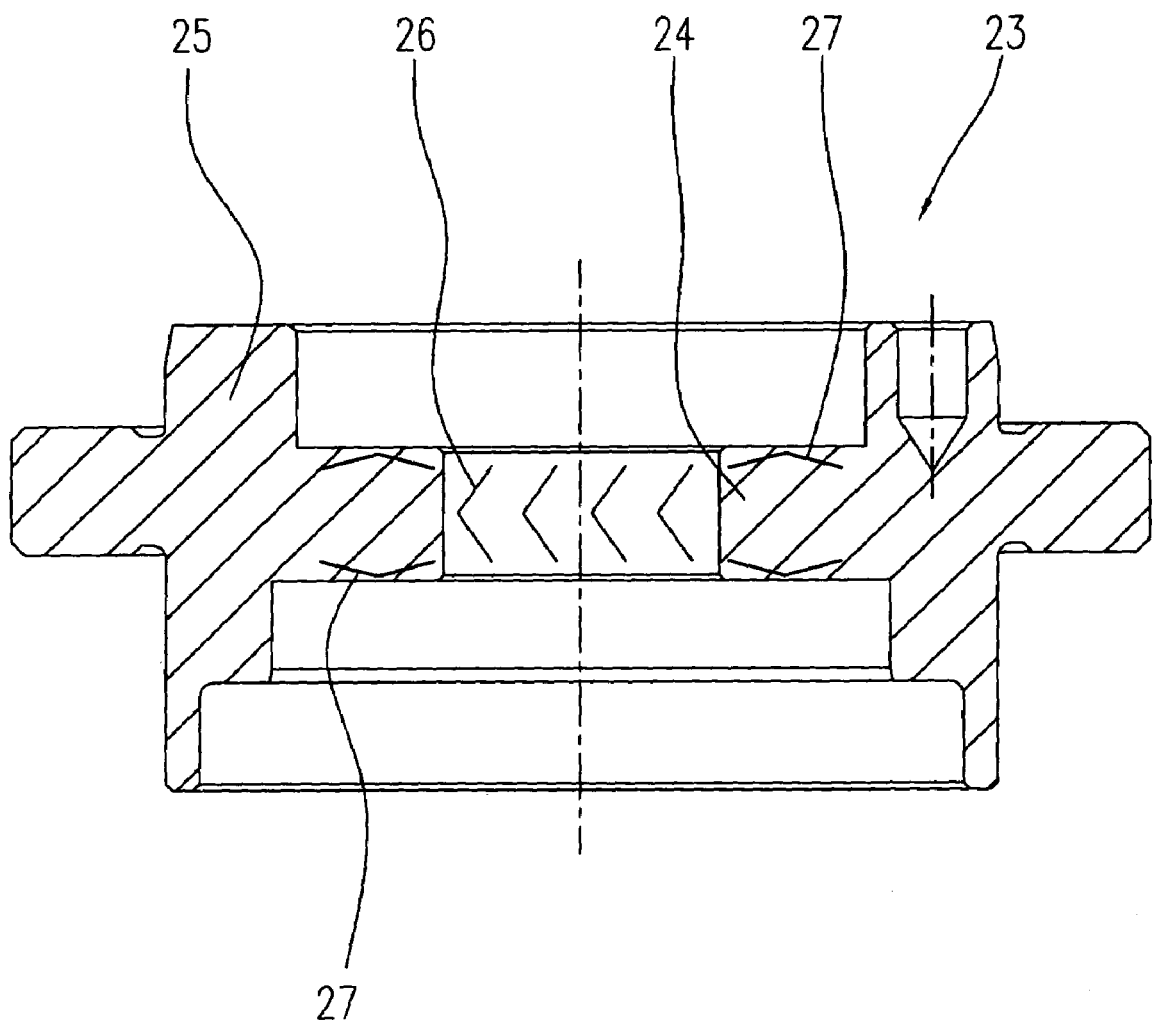
FIG. 3: a section through a third embodiment of an integrally formed arrangement of an open hub and a third bearing disk.

A third embodiment of a one-piece arrangement 23 of the third bearing disk 24 and open hub 25 is shown in FIG. 3, which represents an alternative to the open hub 12 and third bearing disk 4 according to FIG. 1. The radial bearing patterns 26 provided on the inside circumference of the bearing disk 24 can be clearly seen here. The axial bearing patterns disposed on the surfaces of the two end faces of the bearing disk 24 are represented by appropriate symbols 27. The bearing patterns 26, 27 can, for example, be applied to the surfaces of the bearing disk 24 using electro-chemical machining (ECM) methods. The shape of the hub 25 corresponds substantially to the shape of the hub 12 in FIG. 1.

IDENTIFICATION REFERENCE LIST

| | |
|---|---|
| 1 | Bearing disk (first) |
| 2 | Shaft |
| 3 | Bearing disk (second) |
| 4 | Bearing disk (third) |
| 5 | Bearing gap |
| 6 | Radial bearing |
| 7 | Bearing patterns |
| 8 | Axial bearing |
| 9 | Bearing patterns |
| 10 | Axial bearing |
| 11 | Bearing patterns |
| 12 | Hub (open) |
| 13 | Shoulder (hub) |
| 14 | Covering cap |
| 15 | Gap |
| 16 | Hub (closed) |
| 17 | Shoulder (hub) |
| 18 | Gap |
| 19 | Channel |
| 20 | Space |
| 21 | Magnet |
| 22 | Rotational axis |
| 23 | Arrangement |
| 24 | Bearing disk (third) |
| 25 | Hub |
| 26 | Bearing patterns |
| 27 | Bearing patterns (symbolic) |

The invention claimed is:

1. A fluid dynamic bearing system, particularly for the rotational support of a spindle motor, comprising:

a sleeve-shaped first bearing disk (1) having a bore concentric to a rotational axis (22), a cylindrical shaft (2) disposed in the bore and connected to the first bearing disk (1) having a second bearing disk (3) disposed at one end that is arranged at a spacing to the first bearing disk (1) such that an annular disk-shaped space is formed between the first and the second bearing disk;

a third annular bearing disk (4; 24) that is disposed in the annular disk-shaped space and is rotatable about the rotational axis (22), the opposing surfaces of the first, the second and the third bearing disk (1; 3; 4) as well as the shaft (2) being separated from one another by a bearing gap (5) filled with bearing fluid;

at least one radial bearing (6) formed by the opposing circumferential surfaces of the shaft (2) and the third bearing disk (4; 24) and the hydrodynamic bearing patterns (7) associated with these circumferential surfaces, a first axial bearing (8) formed by the opposing end faces of the first and the third bearing disk (1; 4, 24) and the hydrodynamic bearing patterns (9) associated with these end faces, and a second axial bearing (10) formed by the opposing end faces of the second and the third bearing disk (3; 4, 24) and the hydrodynamic bearing patterns (11) associated with these end faces, wherein the bearing system forms a part of a spindle motor, the third bearing disk (4; 24) being connected to a hub (12; 16; 25) of the spindle motor at its outside circumference, and wherein an annular space (20) connected to the bearing gap (5) and tapering in the direction of the bearing gap is disposed between a surface of the inside circumference of the hub (12; 16; 25) and an opposing surface of the outside circumference of the first bearing disk (1), the annular space being at least partly filled with bearing fluid.

2. The fluid dynamic bearing system according to claim 1, characterized in that the bearing patterns (7; 9; 11; 26; 27) are disposed on the end faces and the inside circumferential surface of the third bearing disk (4; 24).

3. The fluid dynamic bearing system according to claim 1, characterized in that the hub (12; 25) is substantially designed as a hollow cylindrical body, the third bearing disk (4; 24) being disposed at the inside circumference of the hub.

4. The fluid dynamic bearing system according to claim 1, characterized in that the third bearing disk (24) and the hub (25) form an integral arrangement (23).

5. The fluid dynamic bearing system according to claim 1, characterized in that an open end of the hub (12; 25) is closed by a covering cap (14), the covering cap enclosing the second bearing disk (3) to a very large extent and sealing it with respect to the environment.

6. The fluid dynamic bearing system according to claim 5, characterized in that a gap (15) is provided between the outer surface of the second bearing disk (3) and the inner surface of the covering cap (14), the gap being connected to the bearing gap (5) and filled with bearing fluid.

7. The fluid dynamic bearing system according to claim 1, characterized in that the hub (16) is substantially a cup-shaped body, the third bearing disk (4) being fixed at the inside circumference of the hub.

8. The fluid dynamic bearing system according to claim 1, characterized in that the hub (16) encloses the second bearing disk (3) to a very large extent and seals it with respect to the environment.

9. The fluid dynamic bearing system according to claim 1, characterized in that a gap (18) is provided between the outer surface of the second bearing disk (3) and the inner surface of the hub (16), the gap being connected to the bearing gap (5) and filled with bearing fluid.

10. The fluid dynamic bearing system according to claim 1, characterized in that the opposing radial sections of the bearing gap (5) are connected to each other by at least one axial channel (19) that runs along the outer surface of the third bearing disk (4) or the inner surface of the hub (12; 16).

11. The fluid dynamic bearing system according to claim 1, characterized in that the space (20) delimits the bearing gap (5) towards the outside and forms a capillary seal for the purpose of sealing the bearing gap.

12. The fluid dynamic bearing system according to claim 11, characterized in that the space (20) forms a reservoir for the bearing fluid.

13. The fluid dynamic bearing system according to claim 1, characterized in that additional fluid dynamic patterns adjoining the gap are located on the surface of the topside of the shaft and/or the underside of the covering cap or the closed hub respectively.

14. A fluid dynamic bearing system, particularly for the rotational support of a spindle motor, comprising:
- a sleeve-shaped first bearing disk (1) having a bore concentric to a rotational axis (22),
- a cylindrical shaft (2) disposed in the bore and connected to the first bearing disk (1) having a second bearing disk (3) disposed at one end that is arranged at a spacing to the first bearing disk (1) such that an annular disk-shaped space is formed between the first and the second bearing disk;
- a third annular bearing disk (4; 24) that is disposed in the annular disk-shaped space and is rotatable about the rotational axis (22), the opposing surfaces of the first, the second and the third bearing disk (1; 3; 4) as well as the shaft (2) being separated from one another by a bearing gap (5) filled with bearing fluid;
- at least one radial bearing (6) formed by the opposing circumferential surfaces of the shaft (2) and the third bearing disk (4; 24) and the hydrodynamic bearing patterns (7) associated with these circumferential surfaces,
- a first axial bearing (8) formed by the opposing end faces of the first and the third bearing disk (1; 4, 24) and the hydrodynamic bearing patterns (9) associated with these end faces, and
- a second axial bearing (10) formed by the opposing end faces of the second and the third bearing disk (3; 4, 24) and the hydrodynamic bearing patterns (11) associated with these end faces,
wherein the bearing system forms a part of a spindle motor, the third bearing disk (4; 24) being connected to a hub (12; 16; 25) of the spindle motor at its outside circumference, and wherein an open end of the hub (12; 25) is closed by a covering cap (14), the covering cap enclosing the second bearing disk (3) to a very large extent and sealing it with respect to the environment.

15. The fluid dynamic bearing system according to claim 14, characterized in that a gap (15) is provided between the outer surface of the second bearing disk (3) and the inner surface of the covering cap (14), the gap being connected to the bearing gap (5) and filled with bearing fluid.

* * * * *